United States Patent
Arslan et al.

(10) Patent No.: US 8,238,463 B1
(45) Date of Patent: Aug. 7, 2012

(54) RECEPTION AND MEASUREMENT OF MIMO-OFDM SIGNALS WITH A SINGLE RECEIVER

(75) Inventors: Huseyin Arslan, Tampa, FL (US); Mustafa Emin Sahin, Tampa, FL (US)

(73) Assignee: University of South Florida, Tampa, FL (US)

( * ) Notice: Subject to any disclaimer, the term of this patent is extended or adjusted under 35 U.S.C. 154(b) by 1087 days.

(21) Appl. No.: 12/139,887

(22) Filed: Jun. 16, 2008

Related U.S. Application Data

(60) Provisional application No. 60/934,578, filed on Jun. 14, 2007.

(51) Int. Cl.
*H04L 1/02* (2006.01)
*H04L 27/22* (2006.01)
*H03D 1/24* (2006.01)

(52) U.S. Cl. ......................... 375/267; 375/320; 375/329

(58) Field of Classification Search .................. 375/267, 375/269, 273, 279, 316, 329, 340, 346, 350, 375/362–365, 320; 370/281, 295, 465, 480, 370/491, 500; 455/39, 91, 112, 216, 500, 455/516
See application file for complete search history.

(56) References Cited

U.S. PATENT DOCUMENTS

| | | | |
|---|---|---|---|
| 6,850,481 B2 | 2/2005 | Wu et al. | |
| 6,965,739 B2 * | 11/2005 | Seto et al. | 398/183 |
| 7,006,810 B1 | 2/2006 | Winters et al. | |
| 7,020,110 B2 | 3/2006 | Walton et al. | |
| 7,054,378 B2 | 5/2006 | Walton et al. | |
| 7,120,201 B2 | 10/2006 | Huang et al. | |
| 7,151,809 B2 | 12/2006 | Ketchum et al. | |
| 7,173,975 B1 | 2/2007 | Al-Dhahir et al. | |
| 7,418,026 B2 * | 8/2008 | Asjadi | 375/136 |
| 2004/0156309 A1 * | 8/2004 | Chadha et al. | 370/208 |
| 2006/0183438 A1 * | 8/2006 | Ishii et al. | 455/101 |
| 2007/0133659 A1 * | 6/2007 | Deng et al. | 375/144 |
| 2008/0273621 A1 * | 11/2008 | Manakkal et al. | 375/267 |
| 2009/0141832 A1 * | 6/2009 | Mudulodu et al. | 375/329 |

OTHER PUBLICATIONS

Ganesan, A.; Sayeed, A.M. "A virtual input-output framework for transceiver analysis and design for multipath fading channels." Communications. IEEE. vol. 51. Issue 7. Jul. 2003. pp. 1149-1161.

Batariere, M.D. Kepler, J.F. Krauss, T.P. Mukthavaram, S. Porter, J.W. Vook, F.W. "An experimental OFDM system for broadband mobile communications." Vehicular Technology Conference. 2001. VTC 2001 Fall. IEEE VTS 54th. vol. 4. pp. 1947-1951.

* cited by examiner

*Primary Examiner* — Lawrence B Williams
(74) *Attorney, Agent, or Firm* — Andriy Lytvyn; Courtney M. Dunn; Smith & Hopen, P.A.

(57) ABSTRACT

A method of receiving Multiple Input Multiple Output— Orthogonal Frequency Division Multiple Accessing (MIMO-OFDMA) signals using a single receiver rather than multiple receivers and performing measurements specific to various parts of MIMO-OFDMA systems using all measurable parameters of MIMO-OFDMA systems is disclosed. In addition, a method of receiving and completing impairment estimation of WiMAX MIMO signals using a single receiver according to the IEEE 802.16 standards is provided.

16 Claims, 11 Drawing Sheets

Device Under Test: Baseband Module
Parameters Measured: Constellation, channel coding, BER, packet error rate

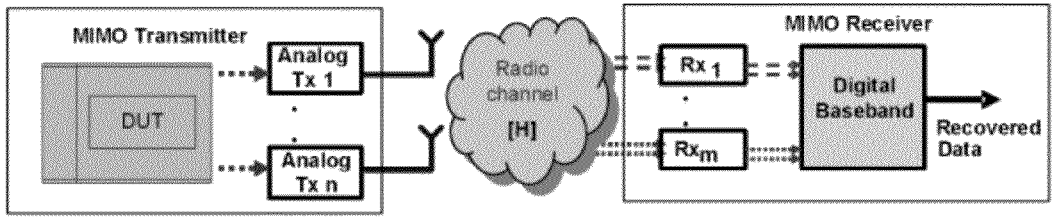

PRIOR ART
Figure 2A

Device Under Test: Multi-Channel Analog Front End
Parameters Measured: Reflection and transmission parameters, RF coupling, IQ impairments, EVM, and CCDF

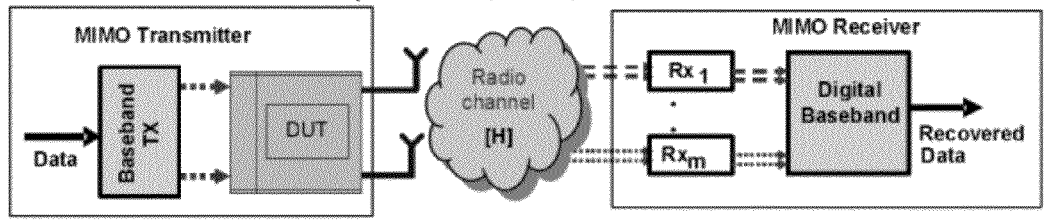

PRIOR ART
Figure 2B

Device Under Test: Antennas and Antenna Configuration
Parameters Measured: Antenna coupling, radiation pattern

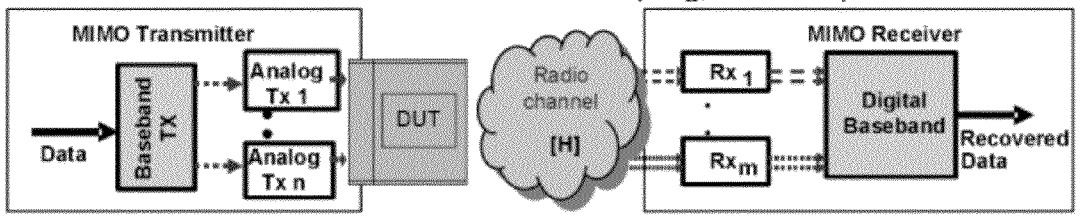

PRIOR ART
Figure 2C

| WiMAX MIMO System Settings ||
|---|---|
| Parameter | Value |
| DL / UL | Downlink |
| Number of transmitters | 2 |
| Number of receivers | 1 |
| MIMO type | Matrix B (SMUX) |
| Permutation | PUSC |
| FFT Size | 1024 |
| Number of symbols | 14 |
| Bandwidth | 10 MHz |
| Modulations | 16QAM & |
| Coding Rates | 1/2 & ½ |

Figure 3

RECEPTION AND MEASUREMENT OF MIMO-OFDM SIGNALS WITH A SINGLE RECEIVER

CROSS REFERENCE TO RELATED APPLICATIONS

This application is a Non-Provisional of co-pending U.S. Provisional Application 60/934,578, filed Jun. 14, 2007, which is fully incorporated herein by reference.

FIELD OF INVENTION

This invention relates to MIMO-OFDM systems

BACKGROUND OF THE INVENTION

Improvements in wireless communications, as well as multimedia applications and hardware, have accelerated the emergence of fourth generation (4G) wireless systems. The primary expectation from all future 4G systems is that they provide extremely high data rates to an very large number of users at the same time. 4G will likely be based on Orthogonal Frequency-Division Multiplexing (OFDM). Worldwide Interoperability for Microwave Access (WiMAX), an OFDM technology, is a suitable candidate for 4G. WiMAX has the potential ability to satisfy challenging throughput and capacity needs and, more importantly, the capacity of WiMAX systems can be improved further by adding Multiple-Input Multiple-Output (MIMO) feature. Because MIMO can considerably enhance the potential of WiMAX systems, it has been made part of the IEEE 802.16 and 802.16e standards.

Systems with MIMO capability operate on a number of parallel channels, which leads to a multiplexing gain. In MIMO systems, at the expense of increased hardware and computational complexity, a high spectral efficiency can be achieved. Part of the increase in hardware and computational complexity is due to the need for multiple transmitters and receivers. The number of receivers has to equal the number of transmitters. The spectral efficiency, which can be utilized as data rate, capacity, or coverage improvement, makes the MIMO technology attractive for bandwidth-greedy wireless applications. Reliable MIMO-OFDM system design requires performing certain MIMO measurements on the system. Optimally, these measurements would be performed by either using multiple Vector Signal Analyzers (VSAs) or a single VSA with multiple input branches. However, this type of measurement setup is very costly.

SUMMARY OF INVENTION

Existing Multiple Input Multiple Output (MIMO)—Orthogonal Frequency Division Multiple Accessing (OFDMA) technology requires the use of multiple receivers. The present invention provides a method of receiving and processing a signal of a MIMO-OFDMA system with a single receiver instead of multiple receivers. In addition, all measurable parameters in a MIMO system are identified and described and a method of performing measurements using only a single receiver is disclosed.

BRIEF DESCRIPTION OF THE DRAWINGS

For a fuller understanding of the invention, reference should be made to the following detailed description, taken in connection with the accompanying drawings, in which:

FIG. 2 is a series of block diagrams of various device-under-test options for MIMO-OFDMA measurements.

FIG. 3 is a table of WiMAX MIMO system settings used to take measurements of WiMAX MIMO systems.

phase difference between the two transmitted signals.

Figure 10:
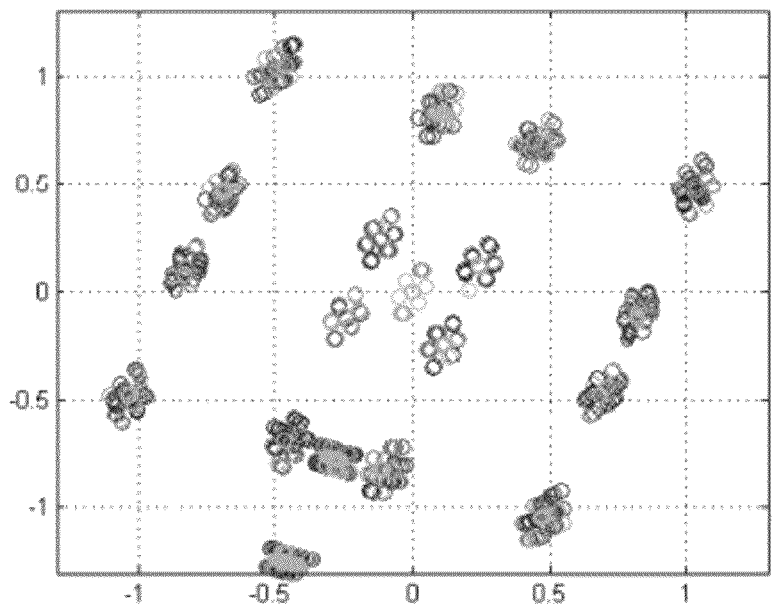

FIG. 10 is a constellation diagram showing a 30% IQ imbalance difference between the two transmitted signals.

Figure 11:
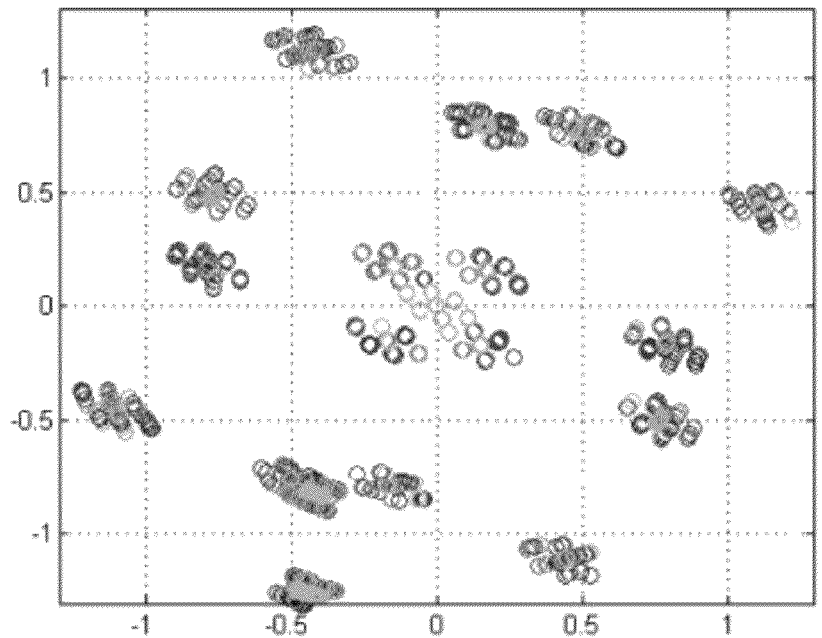

FIG. 11 is a constellation diagram showing a $$\frac{\pi}{12}$$

quadrature error difference between the two transmitted signals.

Figure 12:
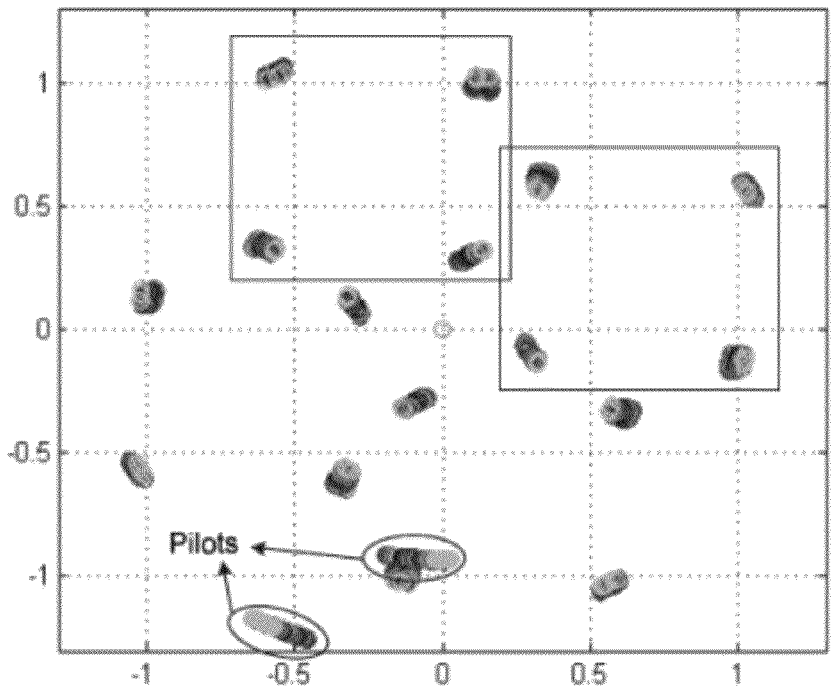

FIG. 12 is a constellation diagram showing a 0.002 radian frequency offset difference between the two transmitted signals.

Figure 13:
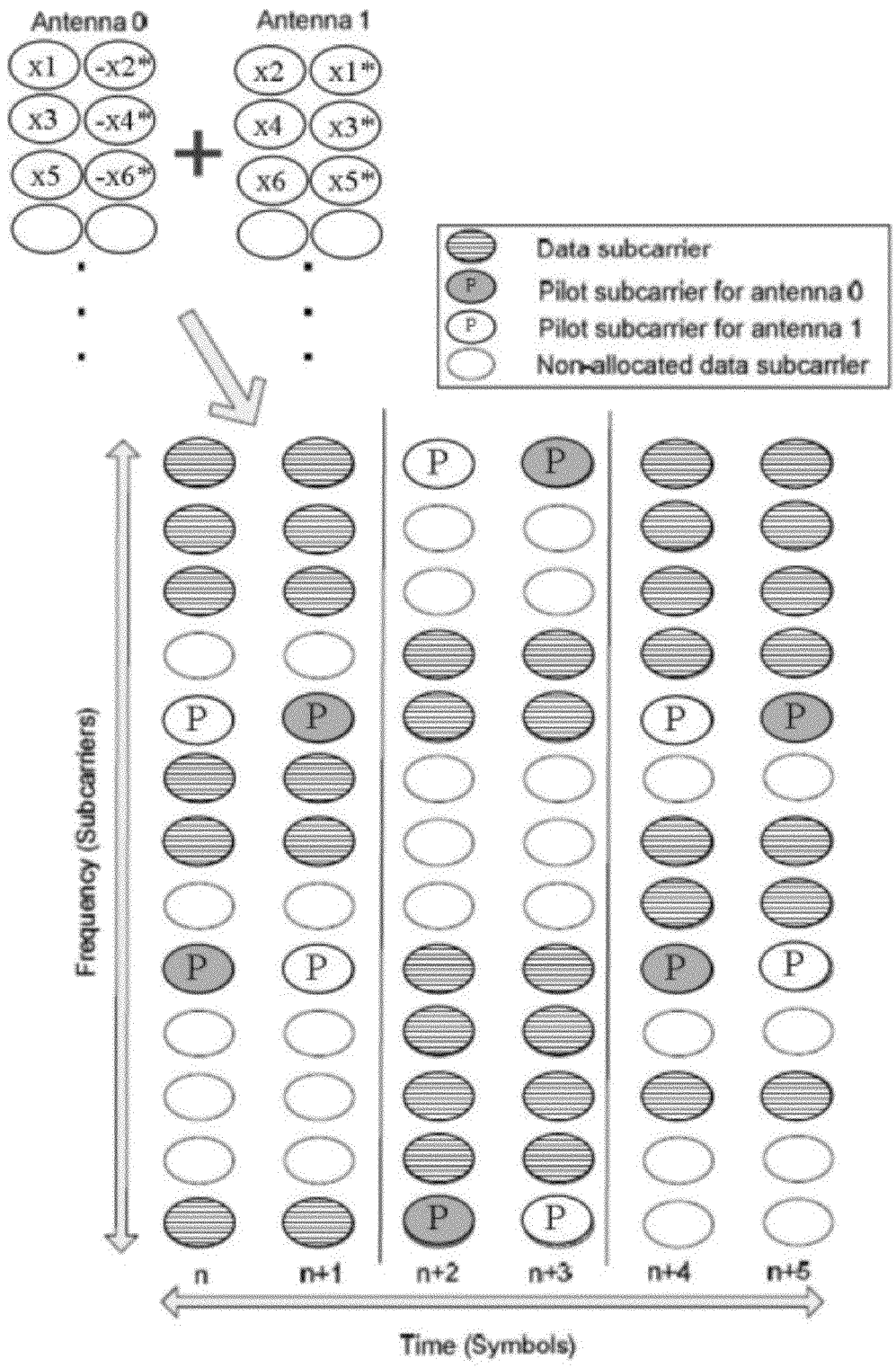

FIG. 13 is an allocation map of subcarriers in downlink PUSC WiMAX. Implementation of Alamouti (space-time) coding is shown.

Figure 14:
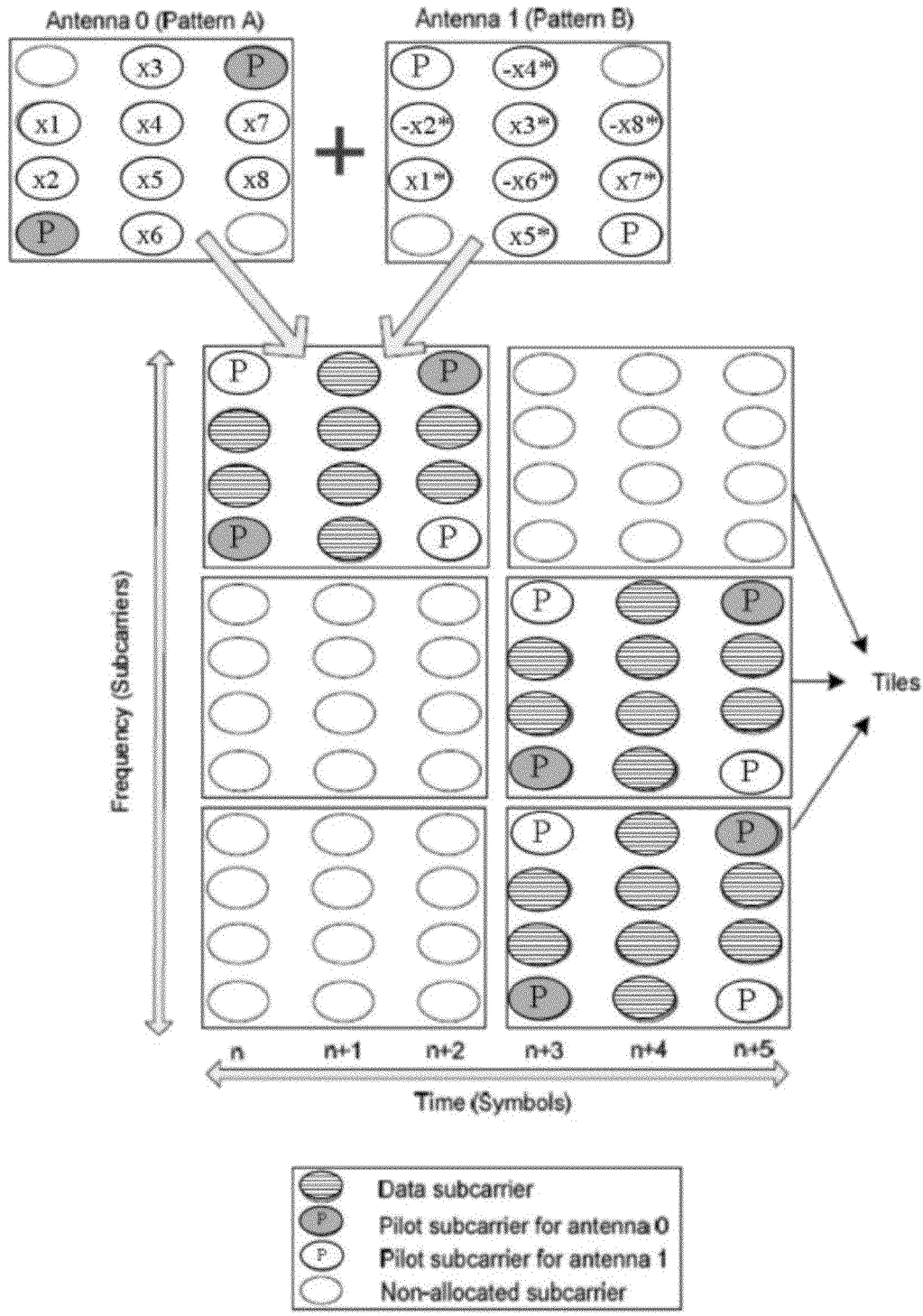

FIG. 14 is an allocation map of subcarriers in uplink PUSC WiMAX. Implementation of space-frequency coding is shown.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Reliable MIMO implementation in WiMAX systems, as well as other OFDMA technologies, requires performing certain MIMO measurements on the system. The present invention presents all of the measurable parameters of MIMO- OFDMA systems, performs measurements for different system components, and provides solutions to specific challenges of some measurements.

Optimally, MIMO measurements and signal reception are performed either by using multiple Vector Signal Analyzers (VSAs) or by a VSA with multiple RF front-ends. This kind of a measurement setup is extremely costly. The present invention provides a more feasible and less costly solution, which employs only a single receiver. Considering a WiMAX MIMO system, the primary RF front-end impairments are analyzed, and a method to estimate each of them is provided. The possible reasons for different impairments in different transmitter branches are addressed. Furthermore, a complete method of processing WiMAX MIMO signals with a single receiver is provided. The procedure handles the signal from its reception up to the symbol decision stage.

Measurable MIMO Parameters

The set of measurable parameters in MIMO systems comprise all parameters in SISO systems such as IQ impairments, spectral flatness, frequency offset, and phase offset. Rather than addressing these well-known parameters, the ones that are the most critical for MIMO implementation will be addressed.

A. Antenna Correlation

The correlation between the antennas of a MIMO system is of vital importance for the system's performance. A high correlation may substantially ruin the diversity and multiplexing gains targeted by using multiple antennas. Antenna correlation can vary depending on the antenna separation and the angular spread of the incoming wave.

Because of its significance on the achievable gains, antenna correlation must be quantified while doing a system performance analysis. The correlation between the receiver (Rx) antennas can be measured with a simple setup. In the transmitter (Tx) side, only one branch is allowed to be active, whose signals are captured by all receiver antennas. By recording and correlating the signals received by each of the antennas, the receiver antenna correlations can be determined. If the complex correlation coefficient is higher than 0.7, a significant reduction in the targeted gains should be expected. In such a case, the most reasonable solution would be to increase the distance between the antennas, if possible.

B. RF Cross-Coupling

In general, the cross-coupling between the RF front-ends of separate branches of a MIMO system is not as important as the antenna correlation. However, signals at different front-ends may become correlated to each other because of the coupling between the front-ends. Hence, the negative effect of RF cross-coupling on the system performance can be significant, and it might be necessary to quantitatively measure it.

Figure 1A:
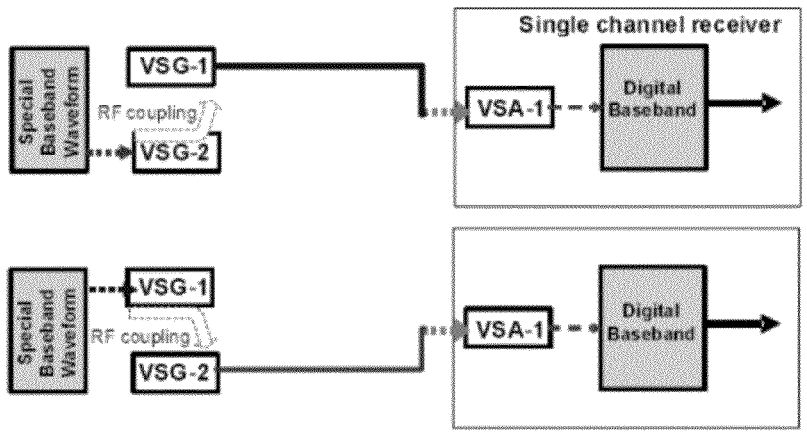
FIG. 1 is a series of block diagrams, which show three methods of measuring RF cross-coupling with a VSA. Parameters that can be measured with these methods include EVM, CCDF, Constellation, CINR, and RSSI.
Figure 1B:
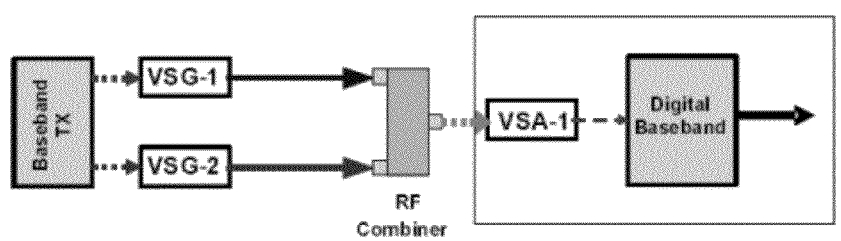
Figure 1C:
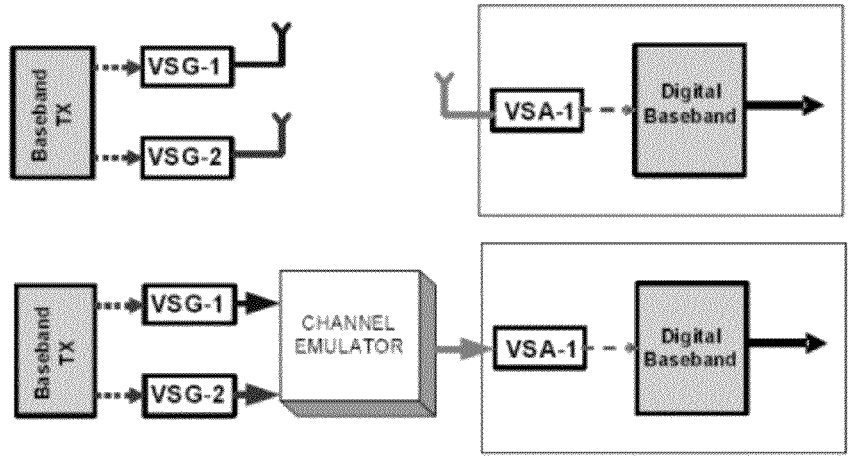

The setup to measure the RF cross-coupling between the two transmitter branches using a single VSA is shown in FIG. 1-a. Two separate measurements are done. In each measurement, a known signal is transmitted from one of the branches while the inactive branch is directly connected to the VSA in the receiver part via a cable. The cross-coupling can be measured in this simple way also when the number of branches is more than two.

C. Error Vector Magnitude and Constellation Parameters

Error Vector Magnitude (EVM) can be defined as the vector difference between the ideal points in a constellation diagram and the decision points based on the received signal measurements. Because the EVM measurements include both amplitude and phase errors, they are a direct indicator of the received signal quality.

EVM and constellation measurements are the most commonly used, and hence, the most important measurements. The setup for these measurements, which can also be used to obtain the complementary cumulative distribution function (CCDF), carrier-to-interference-plus-noise-ratio (CINR), and the received signal strength indicator(RSSI), is illustrated in FIG. 1-a. This setup requires each transmitter branch to quantify the coupling from other branches. The coupling effects from all other active branches have to be canceled while performing measurements on each branch. Cable connection rather than wireless transmission/reception is preferred in order to eliminate the effects of the channel. In this setup, the measurement has to be repeated as many times as the number of transmitter branches in order to obtain all system parameters. Alternatively, an RF combiner with known characteristics can be utilized to measure the parameters of all branches simultaneously, as shown in FIG. 1-b.

D. Channel Parameters

The measurement of the channel parameters constitutes an important initial step in the MIMO implementation. A reliable separation of the signals received at each branch depends on correctly determining the channel fading coefficients. The other important channel parameters to be measured are the channel delay spread, channel coherence time, and the noise level in the channel. In order to get reliable statistics of channel parameters, the same measurements have to be repeated extensively.

The method of performing channel estimation can vary from system to system. Channel estimation in WiMAX MIMO systems is done by making use of orthogonal sets of pilots, one set for each transmitter antenna. The pilots are periodically repeated in both frequency and time. Once the channel parameters are determined, the real radio channel environment can be simulated in an RF test lab by using a channel emulator whose parameters are set according to the channel measurements. The usage of the channel emulator is illustrated in FIG. 1-c. A channel emulator enables convenient testing of various channel conditions; however, this component considerably increases the hardware cost.

MIMO Transmitter Measurement Options

The MIMO-OFDMA transmitter measurements vary according to the part of the system to be tested. The Device Under Test (DUT) can be almost every component or group of components in the system. Possible DUTs include the baseband transmitter, the analog RF front-end, the antennas, the radio channel, and several combinations of these components.

The transmitter measurements ensure that the effects of all the system components, except the DUT, are known accurately, and these effects are calibrated while doing the necessary measurements on the DUT. These measurements are illustrated in FIG. 2. Because of the reciprocity between the transmitter and receiver parts of the system, only the transmitter components will be considered here.

A. Baseband Module

The baseband module can be the DUT if the parameters of the RF front-end, the antennas and the RF channel are available. In this configuration, the analog front-end is the Vector Signal Generator (VSG) with multiple branches. The connection between the transmitter and receiver sides can be made with a direct cable, actual antennas and the radio channel, or a channel emulator.

There are various measurements that can be performed on the baseband module. The accuracy of the constellation points, which are generated by digital means in the baseband, may be investigated. The efficiency of the Forward Error Correction (FEC) coding algorithms implemented in the baseband can also be determined. The indicators of the channel coding efficiency are the Packet Error Rate (PER) and the Bit Error Rate (BER) parameters.

B. Analog RF Front-End

The analog RF front-end may considerably change the transmitted signal. Therefore, it may be necessary to measure its effects on the signal. The reflection and transmission parameters of the RF front-end can be very useful. Also, the cross-coupling between the multiple front-ends that constitute the transmitter part of a MIMO system is a very fundamental parameter to measure. Another quantity to determine related to the RF front-end is the IQ impairments. The IQ impairments are caused by the inconsistency of the I and Q branches of the IQ modulator. The limited accuracy of the local oscillator leads to frequency offset which is also an IQ impairment. The IQ impairments are reflected in the EVM.

C. Antennas

The reflection and transmission parameters are among the measurable quantities for antennas as in the case of the RF front-end. Beside these, the radiation pattern of the antennas according to changing antenna configurations can be measured. When doing the measurements on the analog RF front-end and the antennas, these two system components can be considered separately, or it is also possible to consider them as a whole along with the baseband module to obtain transmitter parameters.

D. Radio Channel

The radio channel can also be considered as a DUT. By doing measurements on the radio channel, various antenna separations and radio environments can be tested to obtain proper channel models. As mentioned earlier, measurable channel related parameters include fading coefficients, channel delay spread, channel coherence time, and the noise level.

Measurement Results

Most of the information presented above was obtained by performing extensive measurements on WiMAX MIMO systems. Two of these measurements will be illustrated to provide an example of what to measure on MIMO systems and what to expect according to the specific measurement setup.

A. Measurement Setup

Figure 4:
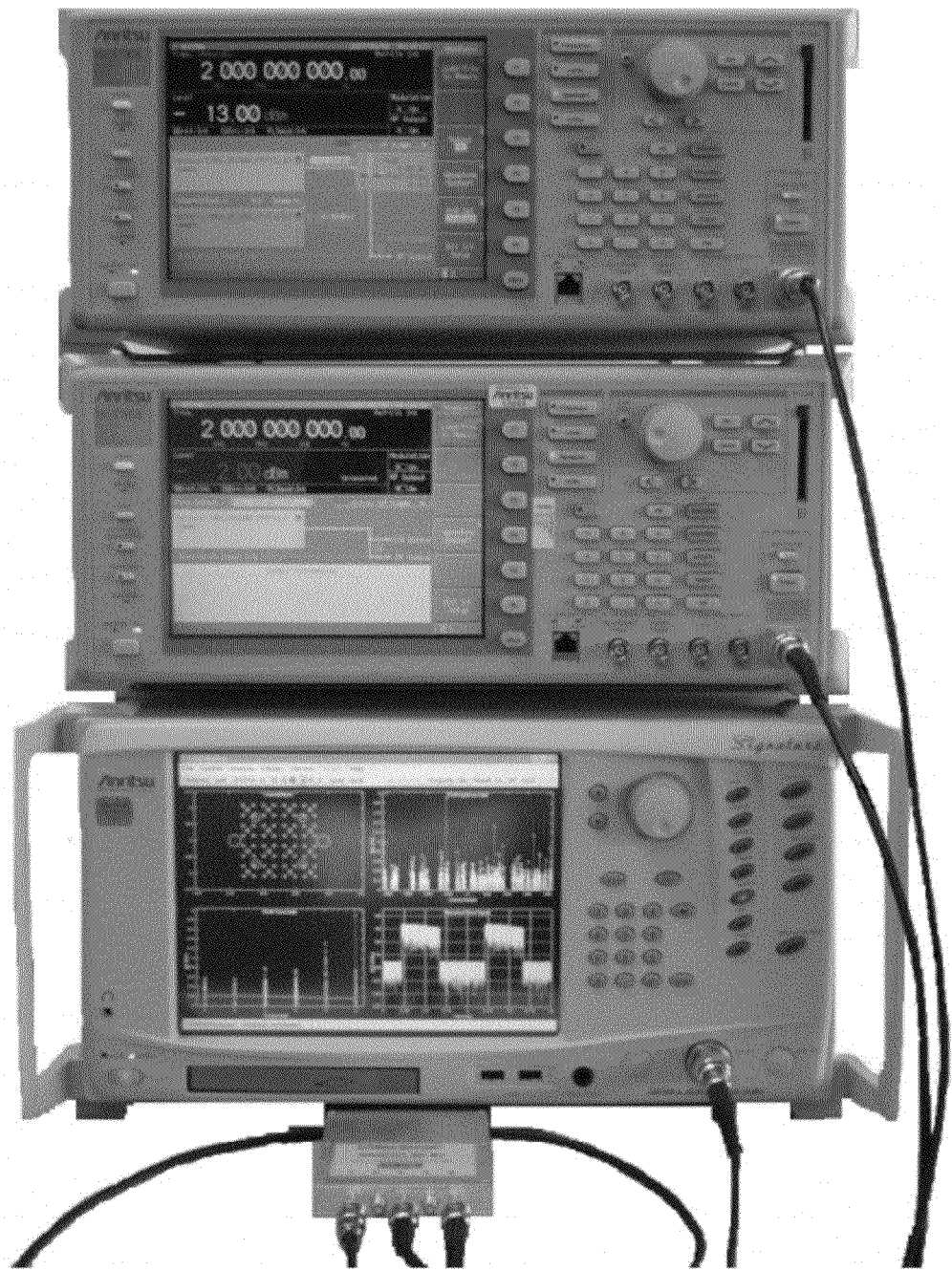
FIG. 4 is a photograph of one of the WiMAX MIMO measurement setups. The outputs of the transmitters are combined with an RF combiner and provided to a single receiver.

In the first setup, Tx and Rx antennas are used. In the second setup, transmitter signals are combined with an RF combiner and fed to the receiver. The second setup is demonstrated in FIG. 4. The WiMAX MIMO system settings, which are common to both setups, are given in the table of FIG. 3. In the 1024 FFT scenarios, there are 840 subcarriers left after removing the guard bands. The measurements performed on the WiMAX MIMO signals include spectral flatness, CCDF, RSSI, constellation, and EVM measurements.

B. Discussion of Results

Figure 5A:
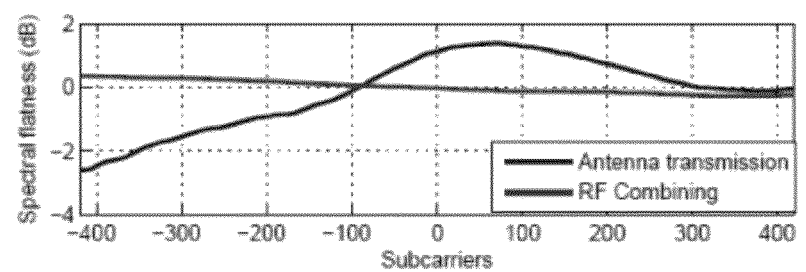
FIG. 5A is a line graph of the spectral flatness measurements for the antenna transmission and RF combining cases.
Figure 5B:
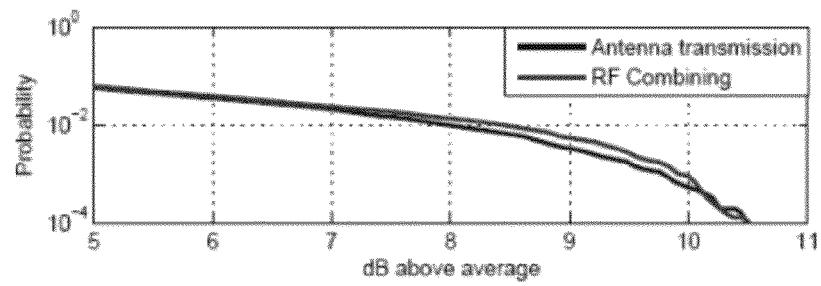
FIG. 5B is a line graph of the CCDF measurements for the antenna transmission and RF combining cases.

The plot of FIG. 5A shows the spectral flatness of the measured channel. For both antenna and RF combining cases, the curve for only one of the channels is plotted. As expected, the wireless channel displays a strong frequency selective behavior. In the second setup, however, the channel that is composed of the RF combiner and the cables that are used for connection has a rather flat frequency response. The plot of FIG. 5B, shows the CCDF curves obtained for both setups. The difference in the distribution of received powers clearly indicates the energy loss in the antenna transmission case. This fact is also verified by the RSSI values determined, which are −25.46 dB and −47.55 dB, respectively.

Figure 6A:
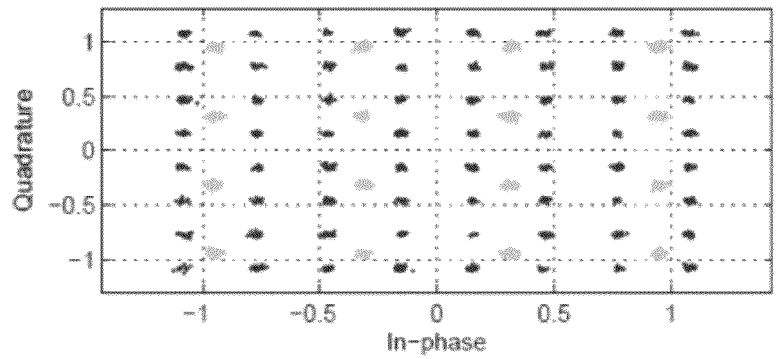
FIG. 6A is a constellation diagram for the antenna transmission.
Figure 6B:
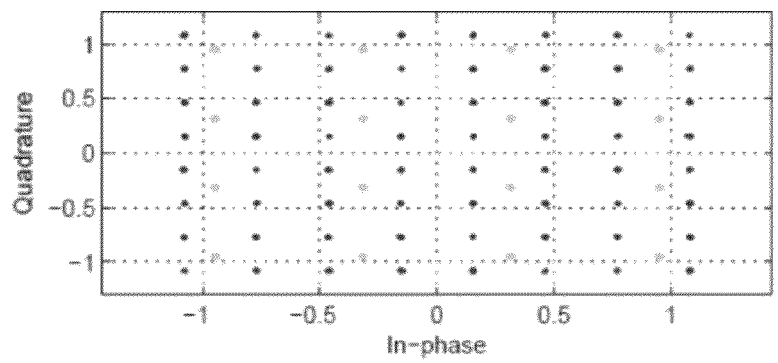
FIG. 6B is a constellation diagram for the RF combining case.
Figure 7A:
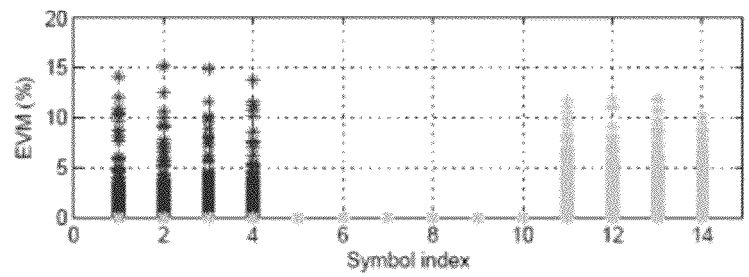
FIG. 7A is a graph of EVM values for the antenna transmission.
Figure 7B:
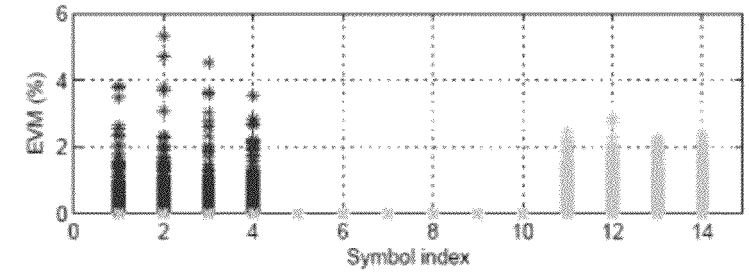
FIG. 7B is a graph of EVM values for the RF combining case.

The constellations of the received signals are shown in FIG. 6. The signals of both 16QAM and 64QAM bursts are plotted on the same constellation map. The wider clouds around the constellation points in the second map indicate the effect of the wireless channel on the MIMO signals in the antenna transmission case. A similar conclusion can be reached by looking at the EVM values demonstrated in FIG. 7. These values are computed symbol by symbol for both setups. The first four symbols belong to 64QAM data bursts, whereas the last four are 16QAM signals. The comparison of the EVMs shows that the difference reaches 10% between the two setups. Also, note that the EVM values are generally higher for 64QAM signals compared to the 16QAM.

Signal Model and the Primary RF Front-End Impairments

In a MIMO-OFDMA system, the received signal contains the effects of various RF front-end impairments. These effects have to be determined and removed before making the symbol decisions.

If $X_m(k)$ is the transmitted OFDMA signal in the frequency domain, then, ignoring the inter-carrier interference (ICI) effects, the received signal can be modeled as $$Y_m(k) = X_m(k)H_m(k)F(k) \times \exp\left(\frac{-j2\pi k\tau}{N}\right)\exp(j\pi\Omega T)$$

$$\text{sinc}(\pi\Omega T) \times \exp\left(\frac{-j\pi k\delta}{f_s}\right)\text{sinc}\left(\frac{\pi d\delta}{f_s}\right)\exp(j2k\pi\Phi_m) + N_m(k)$$

where m is the symbol index, k is the subcarrier index, T is the symbol duration, N is the FFT size, and $$f_s = \frac{N}{T}$$

is the sampling frequency. The remainder of the parameters and their effects are as follows:

[ξ]: The time offset between the transmitter and receiver. The time offset causes a phase shift that increases linearly over the subcarriers, but does not change from one symbol to another;

[Ω]: The frequency offset between the oscillators in both sides. The frequency offset results in a drift that increases with time. All sub-carriers in the same symbol experience the same amount of shift due to the frequency offset;

[δ]: The inaccuracy between the sampling clocks of the transmitter and receiver. The sampling clock error causes a phase shift in frequency, which grows both with time and with frequency;

[$\Phi_m$]: Random phase noise caused by the instability of oscillators. The random phase noise leads to a phase shift that is the same for all subcarriers in the same symbol, but the amount of this shift varies between symbols because of the randomness of the phase error;

[F(k)]: The effective combined frequency response of the analog filters employed in both the transmitter and the receiver;

[$H_m(k)$]: Frequency selectivity and time dependency of the channel. Because of its frequency selectivity, the channel affects the subcarriers differently. It may also vary over time, especially if a mobile channel is considered;

[$N_m(k)$]: Additive complex noise term.

Estimation and Removal of Impairments in the SISO Case

The main factors that lead to impairments in the received signal were introduced above. The method of processing the received signal for the single-input single-output (SISO) case is given below, including the order and short explanations of the necessary impairment estimations. The order of the estimations is important because each estimation assumes that the other errors that affect the subcarriers in the same way have already been removed. Therefore, after each estimation, the corresponding effect has to be removed from the received signal before proceeding to the next step.

1) Packet Detection:

The beginning and the end of the signal packet is determined by utilizing a simple energy detection method. The threshold may have to be modified adaptively according to the received noise power. This initial step serves as a rough timing estimation.

2) Frequency Offset Estimation (Time Domain):

The received time domain signal, Y(n), is correlated with itself, Y*(n+D)

$$Z(n) = \Sigma |X(n)|^2 e^{-jn\Omega D},$$

where D is the symbol length, and |X(n)| is the baseband transmitted signal. Owing to the (identical) pilot subcarriers that are repeated regularly in time, Z(n) can be utilized to obtain the frequency offset by computing $$\Omega = \frac{\angle Z(n)}{-2\pi D}.$$

3) Finer Frequency Offset Estimation (Frequency Domain):

After converting the received time signal into the frequency domain, the values of all subcarriers including the pilots become available. Because the frequency offset changes from symbol to symbol, a finer estimate ($\tilde{\Omega}$) can be obtained by correlating the pilot in two different symbols separated by M symbols ($P_{1,k}$ and $P_{1+M,k}^*$)

$$Z(k) = \sum_k P_{1,k} P_{1+M,k}^* = e^{-j2\pi\Omega M} \sum_k |P_{1,k}|^2,$$

and then computing $$\tilde{\Omega} = \frac{\angle Z(k)}{-2\pi M}.$$

4) Finer Timing Offset Estimation:

If the received signal contains a preamble (or a midamble) that has been added to the signal to facilitate synchronization, a finer timing estimation can be done. Because the transmitter generates the preamble according to a certain standard, the same preamble can be generated in the receiver, as well. Correlating the preamble with the time domain signal yields a very accurate timing estimation.

5) Sampling Clock Error Estimation:

Error in the sampling clock rate adds a phase shift that increases both over symbols and subcarriers. Since the effect of frequency offset (on the symbols) has already been removed, the clock error should be reliably determined by correlating pilots in different symbols.

6) Slope Estimation:

A time offset may still exist at this point, especially if no preamble was sent, because the packet estimation does not determine the signal starting point very accurately. This time offset will indicate itself as an increasing phase slope over subcarriers. Because the impact of the sampling clock error was already canceled in the previous step, the phase slope can be estimated by comparing the phases of the subcarriers in the same symbol.

7) Random Phase Error Estimation:

To determine the random phase error, pilots in different symbols must be correlated. This correlation yields the phase error between the two correlated symbols. Because the amount of error changes randomly from one symbol to another, it has to be determined separately for each symbol.

8) Channel Estimation:

Channel estimation is done using the pilots again, which should now be free from all of the previously mentioned impairments. The channel estimates for the subcarriers between the pilots are obtained by interpolating the pilot values in a reasonable way.

Measurement Challenges in MIMO Compared to SISO

As opposed to systems with a single input, in MIMO systems, the received signal will include the simultaneous transmission of data from multiple transmitter antennas. Therefore, the measured EVM is based on a combined error vector, which cannot be separated into contributions from separate antennas/transmitter branches. However, under some circumstances, the impairments caused by different branches differ substantially, and a common EVM estimation fails to reflect the error magnitude for all of the branches accurately.

The possible factors that lead to different impairment values are outlined below. The MIMO-OFDMA system considered here has two transmitter branches and one receiver branch, which can be readily generalized for a higher number of transmitter branches.

Time offset between the branches: In order to keep the measurements simple, it is desirable to assume that the signals from the two different transmitter branches are received simultaneously. However, there may be a time offset between the received signals if the transmitters are not well synchronized with each other, or if the distances from each transmitter to the receiver are considerably different from each other. In case of a time offset between the transmitter branches, the timing estimation done by the receiver will not be accurate for at least one of the branches.

Employing separate clocks: The oscillator that is needed to generate the sampling instants of the digital-to-analog converter (DAC) can be common to both branches, or each branch can use a separate oscillator. If two separate oscillators are employed by the transmitter branches, serving as sampling clocks, there will be an unavoidable inaccuracy between the sampling periods. This will lead to different sampling clock errors for each branch.

Although it is more reasonable to employ a single clock for the entire transceiver, in some cases, the different transmitter branches may run separate clocks. This occurs if the signals are generated by different sources, such as two vector signal generators (VSGs) or two collaboratively operating mobile devices each with a single antenna. Even if there is a single unit with multiple output branches, because each branch will have its own DAC, there will still be two different sampling clock errors, unless the DACs are run by a common external clock input.

Using separate IQ modulators: The usage of separate IQ modulators in each transmitter branch has various impacts. For instance, it causes the IQ impairments of each branch to be different. In addition, an impact is observed on the frequency offset. Because the output frequencies of the oscillators in each IQ modulator can never be the same, the signals from each branch have a different frequency offset in the receiver part. Another impact of separate IQ modulators is seen on the random phase error. Most local oscillators display an inconsistent behavior in time in terms of the output frequency, i.e. their frequency makes slight variations in time.

This impairment results in phase errors that are random in nature. Therefore, employing two separate local oscillators will lead to two independent phase errors.

Using separate RF components: Because each transmitter branch employs its own mixer, analog RF filters, power amplifier, and antenna, the signals from each branch will be modified differently before being radiated into the air. The advantage of having different RF sections is that their effects can be folded into the channel. Therefore, channel estimations can be considered to include the influence of the RF sections on the received signals.

Detecting the Impairment Differences by Examining the Constellation Diagram

Figure 8:
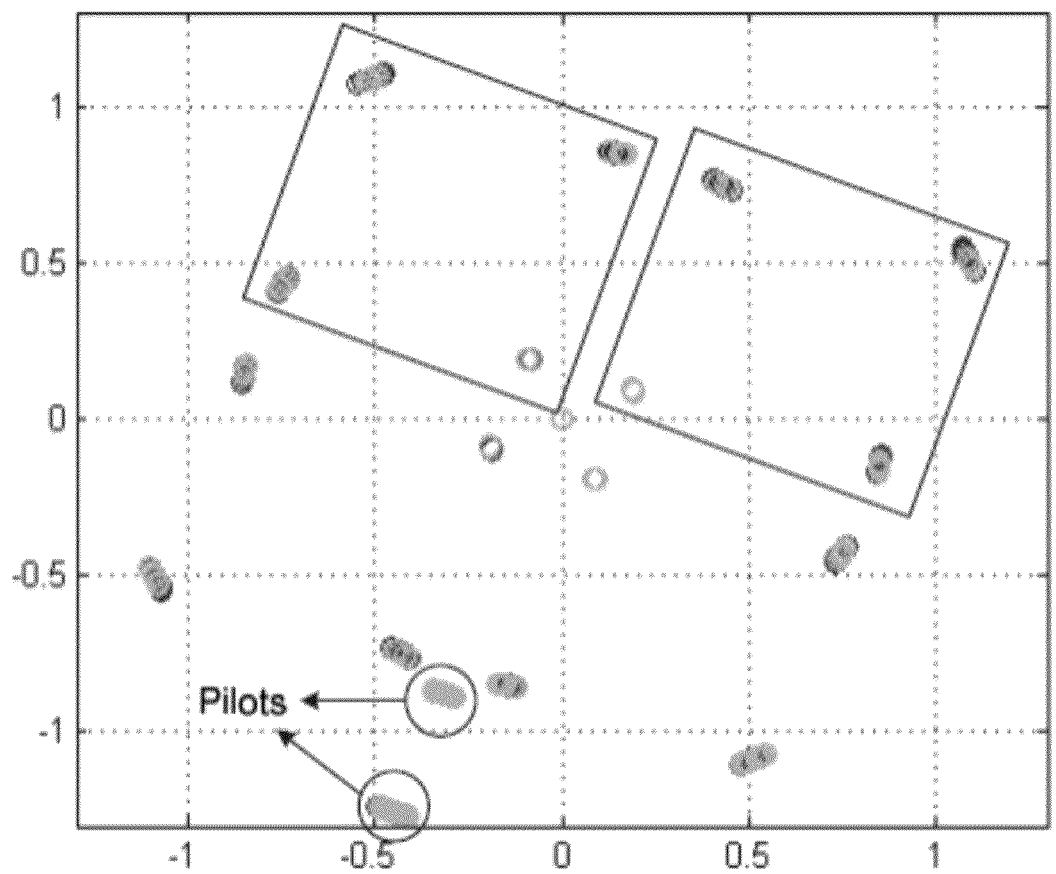
FIG. 8 is a constellation diagram for two QPSK modulated STTD signals before equalization.

When dealing with MIMO signals, having an idea about the potential impairment differences between the transmitter branches can facilitate the measurement of these impairments considerably. Some of these differences can be recognized by investigating the IQ constellation diagram after the removal of offsets from the received combined signal. FIG. 8 shows the constellation for a Quadrature Phase Shift Keying (QPSK) modulated Space-Time Transmit Diversity (STTD)-MIMO signal after the removal of offsets (and before the removal of the channel effects, i.e. equalization). Note that there are sixteen constellation points (as well as two collections of pilot symbols and the point in the middle caused by the non-allocated subcarriers) in the diagram. There are sixteen points because each of the four constellation points in QPSK is summed vectorially with another four points. Two of these quadruples are explicitly indicated with rectangles in FIG. 8.

Figure 9:
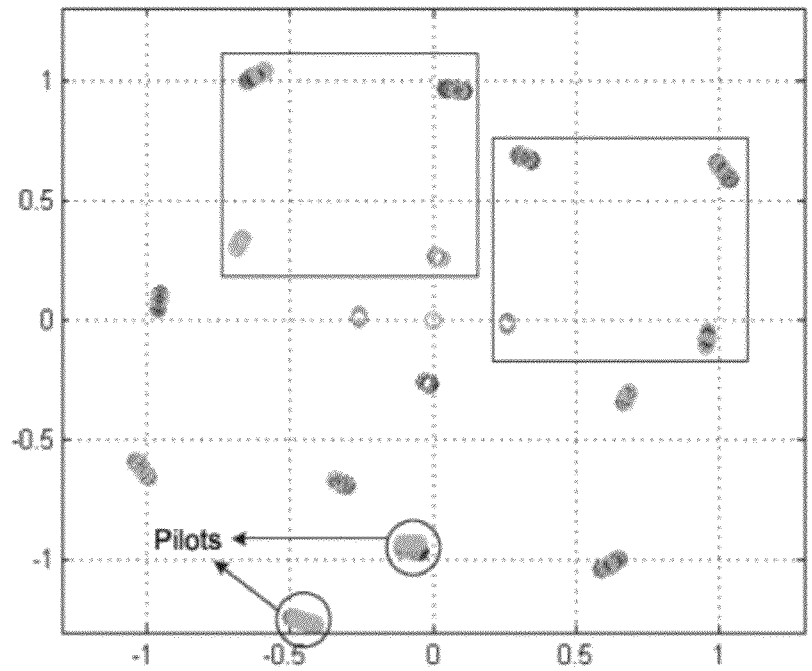
FIG. 9 is a constellation diagram showing a $$\frac{\pi}{12}$$

Simulations studying the effects of certain differences between the two transmitted signals on the constellation were completed. For this purpose, various differences were intentionally set between the two signals. When performing the corresponding simulations, it was assumed that one of the signals is not corrupted (does not have an impairment) but the other one does. That means, one of the signals has no IQ imbalance, but the other one has 30% IQ imbalance, etc. Only one type of impairment difference is assumed to exist at a time. The impairments have been examined one by one, because it may not be possible to make reliable conclusion by simply looking at the constellation if multiple impairment differences exist at the same time. In FIG. 9, the effect of $$\frac{\pi}{12}$$

phase difference between the two transmitted signals is observed. The rotation of the quadruples around their center is apparent. The same effect can be verified by checking the position of the pilots. FIG. 10 shows two signals with 30% IQ imbalance difference. In FIG. 11, the effect of $$\frac{\pi}{12}$$

quadrature error difference between the signals is shown. Finally, in FIG. 12 two signals with 0.002 radian frequency offset difference are shown. Frequency offset has a similar effect to phase difference in terms of rotation of quadruples. However, because the phase shift caused by the frequency offset increases over symbols, a clear shift is seen in the constellation points. Apparently, each of these impairment differences has a different effect on the constellation diagram, and studying these visual effects, one can make a strong guess about the possible problem with the received MIMO signal by just examining the constellation diagram.

Procedure to Handle WiMAX MIMO Signals

Although the term MIMO implies usage of multiple receivers, it is possible to process MIMO signals with a single receiver if separation of the constellations and the EVM contributions of each transmitter branch is made possible. To illustrate the present method, A WiMAX system will be used as an example of MIMO systems using OFDMA, however, other MIMO systems are contemplated. More specifically, space time coded (STC) downlink (DL) and uplink (UL) WiMAX signals with PUSC permutation were analyzed closely. The method is based on the use of pilot sequences. In WiMAX, each Tx branch is transmitting a separate set of pilots that are orthogonal to each other according to their subcarrier allocation maps. The (frequency domain) allocations of pilot subcarriers in DL-PUSC and UL-PUSC are shown in FIGS. 13 and 14. This feature enables separating the impairment contributions from separate branches.

The received time domain signal contains pilot subcarriers from both branches, however, it is not possible to process these pilots separately in time. Therefore, the packet detection and the time domain based frequency offset estimation can be applicable only if the timing offsets and the frequency offsets from the two branches are close to each other. Otherwise, only after converting the signal to the frequency domain, because pilots from different branches get separated from each other, can one apply the offset estimations to pilots from each branch separately.

In the single channel case, after each impairment estimation, the corresponding effect was being removed from the signal. In the MIMO case, however, because each branch has different impairments, it is not valid to remove the effects from the received signal. Instead, the estimated effects are only removed from the corresponding set of pilots. After determining and removing all the effects one by one, the channel estimations, H(k), can be obtained from the pilot sets. Before proceeding to the symbol decision step, the impairment estimations obtained for both channels are applied to the corresponding channel estimations as follows $$\hat{H}_m(k) = H_m(k)\exp\left(\frac{-j2\pi k\tau}{N}\right)\exp(j\pi\Omega T)\exp\left(\frac{-j\pi k\delta}{f_s}\right)\exp(j2k\Phi_m)$$

Combining the MIMO Signals from Two Transmitter Branches

The two MIMO options that are considered in the 802.16 standard are the STTD and the Spatial Multiplexing (SM). The implementation of these two methods, explained below, focuses on how to combine the received MIMO signals in each case.

A. Space-Time Transmit Diversity

In the STTD case, Alamouti encoding is applied to subcarrier pairs, where the same subcarriers of two consecutive OFDM symbols constitute a pair. In the receiver part, the STTD signals are combined in a special way explained below. A single receiver is enough for combining STTD signals, and this is appropriate for employing a single receiver to minimize hardware costs.

In the STTD implementation for DL-PUSC WiMAX, the subcarriers $x_1$ and $x_2$, which constitute a subcarrier pair, are transmitted as $[x_1, -x^*_2]$, respectively, from the first antenna, and in the order of $[x_2, x^*_1]$, from the second antenna, according to the Alamouti coding. In the receiver, the signals received at consecutive symbol times on each carrier pair are $$Y_1(k)=H_1(k)x_1+H_2(k)x_2+N_1,$$

$$Y_2(k)=-H_1(k)x^*_2+H_2(k)x^*_1+N_2,$$

where $H_1(k)$ and $H_2(k)$ are the channel responses, and $N_i$ is noise. These two received signals can be combined in two different ways to yield the transmitted signals as follows $$C_1=\hat{H}_1(k)^*Y_1(k)+\hat{H}_2(k)Y_2(k)^*=x_1(|\hat{H}_1(k)|^2+|\hat{H}_2(k)|^2)+\hat{H}_1(k)^*N_1+\hat{H}_2(k)N^*_2,$$

$$C_2=\hat{H}_2(k)^*Y_1(k)-\hat{H}_1(k)Y_2(k)^*=x_2(|\hat{H}_1(k)|^2+|\hat{H}_2(k)|^2)+\hat{H}_2(k)^*N_1-\hat{H}_1(k)N^*_2,$$

where $\hat{H}_i(k)$ are the channel estimations. Assuming that noise has a limited effect, a reliable estimation for $x_1$ and $x_2$ can be obtained by $$\frac{C_1}{|\hat{H}_1(k)|^2+|\hat{H}_2(k)|^2} \text{ and } \frac{C_2}{|\hat{H}_1(k)|^2+|\hat{H}_2(k)|^2},$$

respectively.

In UL-PUSC WiMAX, on the other hand, the implementation of STTD is different. Alamouti coding is applied to adjacent subcarriers in the same symbol (rather than the same subcarriers in adjacent symbols). Therefore, it is more like space-frequency coding rather than space-time coding. In the receiver, the signals received at consecutive subcarrier locations are $$Y_1(k)=H_1(k)x_1-H_2(k)x^*_2+N_1,$$

$$Y_1(k+1)=H_1(k+1)x_2+(k+1)x^*_1+N_2$$

These signals are combined as follows to obtain the transmitted signals $$C_1=\hat{H}_1^*Y_1(k)+\hat{H}_2Y_1(k+1)^*$$

$$C_2=\hat{H}_1^*Y_1(k+1)+\hat{H}_2Y_1(k)^*$$

and the transmitted signals $x_1$ and $x_2$ can be obtained as in the case of space-time coding.

B. Spatial Multiplexing

In spatial multiplexing, each branch transmits a different signal. Ideally, there should be N receivers if there are N transmitter branches. This way, N independent copies of each transmitted signal are received. By utilizing the channel information, these copies are combined to obtain the desired signals. However, if there is only a single receiver available, the transmitted signals can only be obtained through joint demodulation.

In joint demodulation, at every subcarrier any possible IQ signal pair $[x_1, x_2]$ is considered to be a hypothesis: this means that each hypothesis represents a possible variation of the transmitted signal. The estimation of the channel through which the signal is being transmitted is applied to each hypothesis of that signal. Then, each hypothesis of the signal transmitted by the first transmitter is combined with every hypothesis of the signal transmitted by the second transmitter, and every resulting combination is compared to the actual received signal. The best hypothesis combination is the one that yields the minimum Euclidian distance to the received signal, the Euclidian distance being calculated according to the relation:

$$\epsilon(k)=|Y(k)-\hat{H}_2(k)x_1-\hat{H}_2(k)x_2|^2,$$

where $Y(k)$ is the received signal, $x_1$ and $x_2$ are the two signals that constitute the hypothesis, and $\hat{H}_1(k)$ and $\hat{H}_2(k)$ are the corresponding channel estimates.

This approach is especially effective when only two transmitters are involved: if there are two transmitter antennas, each transmitting, for example, a QPSK modulated signal, then there are $4^2$ hypotheses to check for each received data subcarrier, which does not pose a serious computational challenge. However, the complexity of this method increases proportionally to $N^z$, where N is the modulation order, and z is the number of transmitter branches. Therefore, for MIMO applications that employ a large number of transmitters and use higher order modulations, the computational complexity may set a practical limit to the feasibility of this method. A version of joint demodulation that utilizes multiple receivers can be considered as a solution in such a case.

CONCLUSION

Parallel to the growing interest towards OFDMA and MIMO technologies, the necessity for MIMO-OFDMA measurements is increasing. The present invention provides a method of performing MIMO measurements using a single receiver instead of multiple receiver branches. The measurable MIMO parameters are explained in detail, and the possible device under test options are introduced. Practical measurement results are demonstrated and analyzed for a 2×1 system both for antenna transmission and RF combining setups. The main factors resulting in IQ impairments and the way of eliminating their effects are addressed. The measurement challenges that are specific to MIMO scenarios are analyzed in comparison to the single transmitter case. A detailed method of receiving and combining WiMAX MIMO signals transmitted from two transmitter branches with a single receiver is also given. This way, a complete solution for receiving, measuring, and evaluating MIMO-OFDMA signals with a single receiver is provided.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of processing a received signal having a first plurality of subcarriers from a first transmitter carried over a first channel and a second plurality of subcarriers from a second transmitter carried over a second channel, wherein the first plurality of subcarriers comprises a first plurality of subcarrier pilots and the second plurality of subcarriers comprises a second plurality of subcarrier pilots, the method comprising:
  estimating a first impairment parameter for the first plurality of subcarrier pilots;
  estimating a second impairment parameter for the second plurality of subcarrier pilots;
  removing the first estimated impairment parameter from at least one of the first plurality of subcarrier pilots;
  removing the second estimated impairment parameter from at least one of the second plurality of subcarrier pilots;

estimating the first channel using the at least one of the first plurality of subcarrier pilots with the impairment parameter removed;

estimating the second channel using the at least of one of the second plurality of subcarrier pilots with the impairment parameter removed; and decoding the received signal according to Alamouti space-time based coding using the channel estimation of the first channel and the channel estimation of the second channel.

2. The method of claim 1, wherein each of the first plurality of subcarriers is orthogonal to a corresponding subcarrier in the second plurality of subcarriers.

3. The method of claim 1, wherein Alamouti coding was applied at the transmitters to subcarriers in two consecutive time symbols.

4. A method of processing a received signal having a first plurality of subcarriers from a first transmitter carried over a first channel and a second plurality of subcarriers from a second transmitter carried over a second channel, wherein the first plurality of subcarriers comprises a first plurality of subcarrier pilots and the second plurality of subcarriers comprises a second plurality of subcarrier pilots, the method comprising:

estimating a first impairment parameter for the first plurality of subcarrier pilots;

estimating a second impairment parameter for the second plurality of subcarrier pilots;

removing the first estimated impairment parameter from at least one of the first plurality of subcarrier pilots;

removing the second estimated impairment parameter from at least one of the second plurality of subcarrier pilots;

estimating the first channel using the at least one of the first plurality of subcarrier pilots with the impairment parameter removed;

estimating the second channel using the at least of one of the second plurality of subcarrier pilots with the impairment parameter removed; and decoding the received signal according to Alamouti space-frequency based coding using the channel estimation of the first channel and the channel estimation of the second channel.

5. The method of claim 4, wherein each of the first plurality of subcarriers is orthogonal to a corresponding subcarrier in the second plurality of sub carriers.

6. The method of claim 4, wherein Alamouti coding was applied at the transmitters to adjacent subcarriers in the same time symbol.

7. A method of processing a received signal having a first plurality of subcarrier pilots from a first transmitter carried over a first channel and a second plurality of subcarriers pilots from a second transmitter carried over a second channel, the method comprising:

estimating a first impairment parameter for the first plurality of subcarrier pilots;

estimating a second impairment parameter for the second plurality of subcarrier pilots;

removing the first estimated impairment parameter from at least one of the first plurality of subcarrier pilots;

removing the second estimated impairment parameter from at least one of the second plurality of subcarrier pilots;

estimating the first channel using the at least one of the first plurality of subcarrier pilots with the impairment parameter removed;

estimating the second channel using the at least of one of the second plurality of subcarrier pilots with the impairment parameter removed;

providing a first hypothesis signal which represents a possible variation a signal transmitted by the first transmitter;

providing a second hypothesis signal which represents a possible variation of a signal transmitted by the second transmitter;

applying the channel estimation of the first channel to the first hypothesis signal;

applying the channel estimation of the second channel to the second hypothesis signal; and combining the first hypothesis signal with the first channel estimation applied and the second hypothesis signal with the second channel estimation applied to create a first combined signal estimate.

8. The method of claim 7, further comprising:

providing a third hypothesis signal which represents a possible variation of a signal transmitted by the first transmitter;

providing a fourth hypothesis signal which represents a possible variation of a signal transmitted by the second transmitter;

applying the channel estimation of the first channel to the third hypothesis signal;

applying the channel estimation of the second channel to the fourth hypothesis signal;

combining the third hypothesis signal with the first channel estimation applied and the fourth hypothesis signal with the second channel estimation applied to create a second combined signal estimate; and determining the most accurate combined signal by comparing each combined signal estimate with the received signal.

9. The method of claim 8, wherein determining the most accurate combined signal by comparing each combined signal estimate with the received signal further comprises:

determining the combined signal yielding a minimum Euclidian distance to the received signal, the Euclidian distance being calculated according to the relation:

$$\epsilon(k)=|Y(k)-\hat{H}_1(k)x_1-\hat{H}_2(k)x_2|^2,$$

wherein $Y(k)$ is the received signal, $x_1$ and $x_2$ are the two hypothesis signals, and $\hat{H}_1(k)$ and $\hat{H}_2(k)$ are the corresponding channel estimates.

10. The method of claim 7, wherein each of the first plurality of subcarriers is orthogonal to the corresponding subcarriers in the second plurality of sub carriers.

11. The method of claim 8, wherein the third hypothesis signal is different from the first hypothesis signal.

12. The method of claim 8, wherein the fourth hypothesis signal is different from the second hypothesis signal.

13. A method of processing a received signal comprising a first signal from a first transmitter transmitted over a first channel and a second signal from a second transmitter transmitted over a second channel, the method comprising:

estimating the first channel;

estimating the second channel;

providing a first set of hypothesis signals, wherein each hypothesis signal represents a possible variation of the first signal;

providing a second set of hypothesis signals, wherein each hypothesis signal represents a possible variation of the second signal;

applying the channel estimation of the first channel to the hypothesis signals in the first set;

applying the channel estimation of the second channel to the hypothesis signals in the second set; and combining the first set hypothesis signals with the first channel estimation applied and the second set hypothesis signals with the second channel estimation applied to create a set of combined signal estimates; and determining the most accurate combined signal by comparing each combined signal estimate with the received signal.

14. The method of claim 13, wherein determining the most accurate combined signal by comparing each combined signal estimate with the received signal further comprises:

determining the combined signal yielding a minimum Euclidian distance to the received signal, the Euclidian distance being calculated according to the relation:

$$\epsilon(k)=|Y(k)-\hat{H}_1(k)x_1-\hat{H}_2(k)x_2|^2,$$

wherein $Y(k)$ is the received signal, $x_1$ and $x_2$ are the two hypothesis signals, and $\hat{H}_1(k)$ and $\hat{H}_2(k)$ are the corresponding channel estimates.

15. The method of claim 13, wherein the hypothesis signals in the first set are all different.

16. The method of claim 13, wherein the hypothesis signals in the second set are all different.

* * * * *